(12) United States Patent
Svanberg et al.

(10) Patent No.: US 7,190,698 B2
(45) Date of Patent: Mar. 13, 2007

(54) NETWORK OPTIMISATION METHOD

(75) Inventors: Emil Svanberg, Lulea (SE); Joachim Johansson, Lulea (SE); Anders Torger, Lulea (SE); Joakim Norrgard, Lulea (SE); Anders Larsson, Lulea (SE)

(73) Assignee: Operax AB, Lulea (SE)

( * ) Notice: Subject to any disclaimer, the term of this patent is extended or adjusted under 35 U.S.C. 154(b) by 1064 days.

(21) Appl. No.: 10/257,248

(22) PCT Filed: Apr. 6, 2001

(86) PCT No.: PCT/EP01/04062

§ 371 (c)(1),
(2), (4) Date: Oct. 10, 2002

(87) PCT Pub. No.: WO01/80485

PCT Pub. Date: Oct. 25, 2001

(65) Prior Publication Data

US 2003/0103510 A1 Jun. 5, 2003

Related U.S. Application Data

(60) Provisional application No. 60/197,006, filed on Apr. 13, 2000.

(51) Int. Cl.
*H04L 12/28* (2006.01)
*H04L 12/56* (2006.01)
(52) U.S. Cl. .................... 370/395.2; 370/351; 370/401
(58) Field of Classification Search ............ 370/395.2, 370/395.21, 395.31, 395.4, 351, 401, 461, 370/462, 329, 465, 466
See application file for complete search history.

(56) References Cited

U.S. PATENT DOCUMENTS

| | | | |
|---|---|---|---|
| 5,953,338 A | 9/1999 | Ma et al. .................... 370/395 |
| 6,487,170 B1 * | 11/2002 | Chen et al. .................. 370/231 |
| 6,538,416 B1 * | 3/2003 | Hahne et al. ................ 370/431 |
| 7,054,938 B2 * | 5/2006 | Sundqvist et al. .......... 709/227 |

* cited by examiner

*Primary Examiner*—Dang T. Ton
*Assistant Examiner*—Farah Faroul
(74) *Attorney, Agent, or Firm*—Young & Thompson

(57) ABSTRACT

Method in a packet based communication network including network domains to establish a virtual leased line (VLL) between a source (SRC) and a destination (DST) in different domains in order to achieve packet transfer between the source and the destination, wherein a bandwidth broker (BB) is associated to each network domain.

8 Claims, 3 Drawing Sheets

NETWORK OPTIMISATION METHOD

FIELD OF THE INVENTION

The present invention relates to a method in a packet based communication network including network domains to establish a virtual leased line (VLL) between a source (SRC) and a destination (DST) in different domains in order to achieve packet transfer between the source and the destination

BACKGROUND OF THE INVENTION

Within the Internet community there are several initiatives towards improving different aspects of the Internet. Some of the major issues are: (1) extending the service model, (2) routing and forwarding efficiency and scalability, and (3) operations and management.

All of these are important to the continued growth and success of the Internet. The present application is related to a combination of two emerging technologies, MultiProtocol Label Switching (MPLS) and Bandwidth Brokers (BB), which have great potential in the context of all three mentioned issues. The main focus of the present invention is on the implementation of a bandwidth guaranteed service called Virtual Leased Line, or VLL.

The following section briefly describes the two technologies MPLS and BB. MPLS is undergoing standardisation in the Internet Engineering Task Force (IETF) while there is currently no formal effort to standardise Bandwidth Brokers.

The MPLS working group of the IETF was started in response to the label-switching trend among router vendors back in 1997. At the time, there existed several proprietary implementations and the need for standardisation was identified.

MPLS is a method that integrates the label-switching forwarding paradigm with network layer routing. In MPLS, connection-oriented switching is provided based on IP routing and control protocols.

In short, MPLS operates as follows:

Associate labels with specific streams of forward equivalence classes (FECs).

Distribute the labels and their FEC bindings across the network, the MPLS domain, to establish a Label Switched Path (LSP).

Assign packets one or more labels (a stack of labels) when entering the domain.

Forward packets through the domain based upon the labels.

Core components of MPLS are semantics of labels, forwarding methods and label distribution methods.

The explicit routing feature of multiprotocol label switching (MPLS) was introduced to address the shortcomings associated with current IP routing schemes, which are hampered by the requirement to forward packets based only on destination addresses along shortest paths computed using mostly static and traffic characteristic independent link metrics. While this shortest path routing is sufficient to achieve connectivity, it does not always make good use of available network resources and is not satisfactory from a traffic-engineering point of view. A prime problem is that some links on the shortest path between certain ingress-egress pairs may get congested while links on possible alternate paths remain free. Even in the best effort model, this means that available network resources are not being used well, resulting in higher delays, and there is a potential for providing better quality of service (QoS) with the same network infrastructure.

In MPLS networks, when bandwidth-guaranteed label-switched paths (LSPs) are set up, shortest path routing with fixed link metrics can cause LSP set-up requests to be rejected, even though these requests may have been admissible using a different routing scheme. Therefore, routing schemes that can make better use of network infrastructure are needed. This better use of network infrastructure while maintaining QoS guarantees is the primary objective of traffic engineering. MPLS networks' ability to control the path from ingress node to egress node to optimise utilisation of network resources and enhance performance is regarded as a primary justification for the use of MPLS.

In MPLS packets are encapsulated, at ingress points, with labels that are then used to forward the packets along LSPs. Service providers can use bandwidth-guaranteed LSPs as components of an IP virtual private network (VPN) service with the bandwidth guarantees used to satisfy customer service level agreements (SLAs). These LSPs can be thought of as virtual traffic trunks that carry flow aggregates generated by classifying the packets arriving at the edge or ingress routers of an MPLS network into forwarding equivalence classes (FECs). Classification into FECs is done using packet filters that examine header fields such as source address, destination address, and type-of-service bits. The filter rules determining the FECs can be established in a variety of ways such as downloading from a policy or route server, or interaction with routing protocols. The purpose of classifying packets into FECs is to enable the service provider to traffic engineer the network and route each FEC in a specified manner. This is done by mapping arriving packets belonging to an FEC to one of the LSPs associated with the FEC. Before mapping packets onto an LSP, the LSP is set up, along an explicit route if specified, using a signalling protocol permitting resource reservation such as Resource Reservation Setup Protocol (RSVP).

The cost-efficiency of IP networks is partly achieved through the connection-less traffic model resulting in efficient sharing of resources. However, this model does not allow for quality guarantees, without additional functionality for service differentiation in network devices. In recent years such functionality has become common, and static Quality of Service (QoS) configurations with it. By introducing a Bandwidth Broker (BB) into the network QoS policy management can be handled in a more flexible way.

A bandwidth broker is an entity in a network domain that manages policies for bandwidth resources. By maintaining a database of the domain's resources it provides admission control decisions on QoS service requests. It is also responsible for configuring the network to meet the granted policies. It may be able to communicate with bandwidth brokers in neighbouring domains, allowing QoS services spanning several domains.

In WO-00/30295 is described a method for providing admission control and network Quality of Service (QoS).

In the background section of the WO-application drawbacks with prior art techniques are discussed focusing inter alia on the scalability concerns leading to the development of the Differentiated Services (DiffServ) architecture. Diffserv allows distinct levels of network service to be provided to different traffic. However, rather than storing per-flow state information on each intermediate node in the network between the sender and the receiver(s), routers within a DiffServ network handle packets on different traffic flows by applying different per-hop behaviours (PHBs) based upon the setting of bits in the TOS field of each packet's IP header. In this manner, many traffic flows may be aggregated into one of a small number of predefined PHBs, thereby allowing a reduction in the amount of processing and storage associated with packet classification and forwarding. While solving the scalability issues, DiffServ fails to provide adequate guidance with regard to implementation of an admission control policy.

One approach for performing admission control suggested by the DiffServ framework involves using a centralised bandwidth broker. The centralised bandwidth broker has control over the entire domain and centrally handles bandwidth allocation requests. The following example briefly describes the work performed by a bandwidth broker.

A sender wishing to establish a particular level of service for a data flow between it and a receiver transmits an indication of its requirements to a centralised bandwidth broker. The centralised bandwidth broker validates the request against policies, compares the request against the current allocation of bandwidth for accepted traffic, and configures the edge devices with information needed to mark and shape (or police) incoming packets for the flow. Subsequently, as packets that are part of the established data flow traverse the DiffServ network cloud, intermediate core devices apply a PHB that corresponds to the DiffServ service level indicated in the packet header.

In WO-00/30295 the object is to achieve a network that handles the shortcomings of using a centralised broker, e.g. that a useful centralised broker may be very complex and has limited capability to handle bandwidth requests for multicast sessions.

Below is described the current state of the art in using MPLS alone and a combination of Bandwidth Brokers and MPLS. The main focus of this section is on extending the service model (i.e., implementing QoS).

The MPLS standards cover mechanisms and protocols that provide the basic tools for MPLS networking. Given the current standards and available equipment, many MPLS networks are manually routed. In such a network the main advantages of using MPLS are fast fail over-routing and a clear separation of inter- and intra-domain routing. These properties of MPLS do not really qualify as QoS-enablers, but are good examples of how MPLS is used.

Another common application of MPLS is for VPN set-up by administrative tools (for example Orchestream). In these applications the main advantage is that the shared network is partitioned into private VPNs using the MPLS LSPs.

There is a system known as Routing and Traffic Engineering Server (RATES) which is described as an MPLS traffic-engineering server. The system is described by Aukia, Kodialam, Koppol, Lakshman, Sarin and Suter in: "*RATES: A server for MPLS Traffic Engineering*", IEEE Network Magazine, May 2000. Referred to as [RATES] below. The model under which RATES operates is that service requests are passed to an engine that evaluates them and possibly implements the service in the network. A service request is defined by source and destination addresses (or prefixes) and a bandwidth constraint. [RATES] defines a routing algorithm, which tries to find a path that can accommodate the requests. This is in contrast to other systems, which merely use the routes available from layer three routing (normally shortest paths).

A current state of the art Bandwidth Broker ($BB_{OLOV}$) system is described in Olov Schelén, *Quality of Service Agents in the Internet*,Doctoral Thesis, Department of Computer Science and Electrical Engineering, Division of Computer Communication, Luleå University of Technology, Luleå, 1998.Referred to as [OLOV] below.

$BB_{OLOV}$ has many similarities to RATES. The $BB_{OLOV}$ is described in the context of DiffServ networks while RATES operates in MPLS. Apart from that basic difference, these two systems operate under the same model; receive service requests, evaluate them and possibly implement the service. This is schematically illustrated in FIG. 1. The major difference between these two systems is the underlying networking technology.

An important property of both RATES and $BB_{OLOV}$ is the implementation of path sensitive admission control. Both systems make sure that all links on a path have enough forwarding resources to keep up with the service request. Path sensitive admission control (by a centralised entity) requires detailed knowledge of the network topology, or rather, the routing topology. Both RATES and $BB_{OLOV}$ use the straightforward method of peering as a link state-router, which provides a dynamic and detailed view of the routing topology.

Routers in a link state-domain continuously synchronise topology information with each other. All routers have all information needed to build a complete view of the domain topology. Changes in one part of the network are flooded across the entire domain, making sure that all routers have information that is up to date. Peering as a link state-router simply means that a host takes part in the information exchange to receive all information dynamically. This can be done passively, which means the host does not advertise any information of its own.

Each RATES instance is limited to one flat link state-domain (e.g. an Open Shortest Path First (OSPF) area), while $BB_{OLOV}$ is assumed to control an entire routing domain, which may utilise hierarchical routing. In the case of hierarchical routing, $BB_{OLOV}$ relies on routing probes, which act as routing peers within flat link state-domains to collect routing information.

Using systems like these, which use the MPLS and BB concepts in combination, it is possible to achieve dynamic QoS service set-up and tear-down in either DiffServ or MPLS networks.

The state of the art in MPLS and the combination of MPLS traffic-engineering servers and bandwidth brokers have some shortcomings, which is briefly discussed in the following.

An overall object of the present invention is focused on the implementation of a VLL service with bandwidth guarantees, which requires path sensitive admission control. For the service to be as useful as possible it is important that service control is dynamic and managed automatically. The service issues focused on are:

End to end-services.

Resource planning over time.

The end-to-end issue is of great importance when service requests span multiple network provider domains and possibly a mix of DiffServ and MPLS networks. A service that is only available within one provider domain is unlikely to be successful in a world where global services of all kinds are increasingly important.

Planning resources over time is an important issue if bandwidth guaranteed services on otherwise shared networks are to become a credible alternative to more rigid solutions such as leased lines or circuit switched networks. Business users will certainly require the ability to plan ahead when it comes to QoS. A business whose mission critical applications fail due to unavailability of network QoS is very likely to abandon the failing provider.

During the development of the Bandwidth Broker model the initial focus were end-to-end services. A Bandwidth Broker is responsible for the bandwidth resources within its domain and can trade bandwidth with brokers in neighbouring domains. These ideas are not tightly coupled to the way admission control is performed. However, to implement services like the bandwidth guaranteed VLL, a very specific admission control method is required. The above-mentioned state of the art MPLS traffic engineering server, RATES, covers only one link state-area which is in fact only a small part of a provider domain. This means that several RATES systems are needed to cover a single domain.

The Bandwidth Broker $BB_{OLOV}$ in the Olov Schelen thesis identified above defines a method, which enables planning of a VLL service over time. Admission control, which is at the core of implementing the service, is performed with time as an input parameter.

The [RATES] system does not consider time at all. Admission control for service requests is done at the time the request is made. The inability to plan over time requires a compromise in network utilisation versus customer values. For example, if a customer relies on the availability of bandwidth resources for a business event a week ahead from now, he needs to make the request as soon as possible to make sure that his request will be admitted. Awaiting the event, the customer will be paving for a service that he has no use for.

For MPLS networks, there is currently no known solution to this problem.

In Schelén O et.al. "Performance of QoS agents for provisioning network resources", Quality of Service, 1999. IWQOS '99. 1999 Seventh international workshop on London UK 31 May-4 June 1999, Piscataway, NJ, USA, IEEE, US, 31 May 1999, pages 17–26, ISBN: 07803-5671-3, discloses a method for providing resource reservations for VLLs between network domains. The reservations may be scheduled over time and each reserved path may have a predetermined QoS. A Qos agent (or Bandwidth Broker) performs admission control in its domain. However, this paper does not disclose a method for performing the resource reservations in a network having heterogeneous MPLS domains.

Thus, a first object of the present invention is to achieve a method that implements end-to-end services (of the VLL kind) across a set of heterogeneous MPLS domains.

A second object of the present invention is to achieve a method implementing a resource planning of a VLL service over time.

SUMMARY OF THE INVENTION

The above-mentioned objects are achieved by a method according to the independent claim.

Preferred embodiments are set forth in the dependent claims.

The present invention relates to a method using an inventive combination of the ideas in [OLOV] and [RATES] that provides a solution to both of the problems related to the first and second objects stated above.

There are lots of efforts in the area of QoS for both DiffServ and MPLS networks. Most of which deal with mechanisms or algorithms at the forwarding plane. To achieve well-defined, manageable services components like admission control are required. This invention makes use of a concept of admission control to achieve services across domain borders.

The key merits of the invention are:

Deployment. Network operators all over the world are using different solutions for their networks. For any type of global service, support for heterogeneous networking technologies is very important. This invention makes it possible to deploy bandwidth guaranteed end-to-end VLL services across the two of the most commonly used QoS models.

Network utilisation. The use of admission control in advance allows network resources to be more efficiently utilised [OLOV]. This invention makes previously unknown use of this powerful tool in MPLS networks.

SHORT DESCRIPTION OF THE APPENDED DRAWINGS

Figure 4:
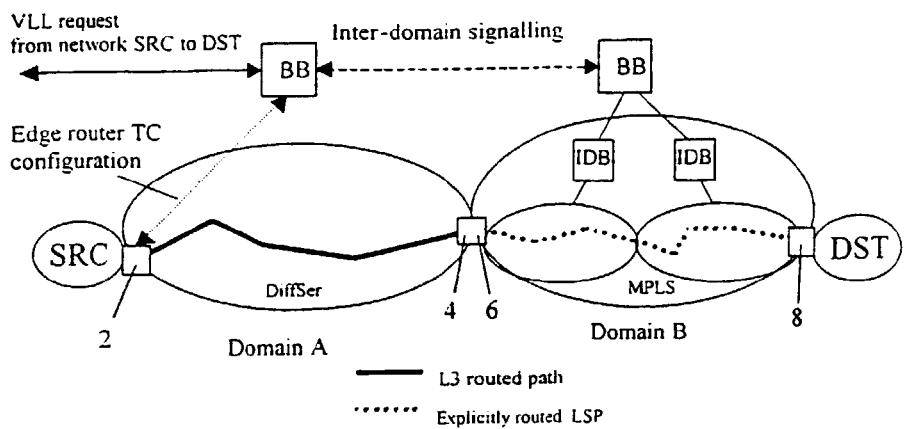

FIG. 4 provides an example scenario where a VLL spanning two domains is setup using the method according to the present invention.

Figure 5:
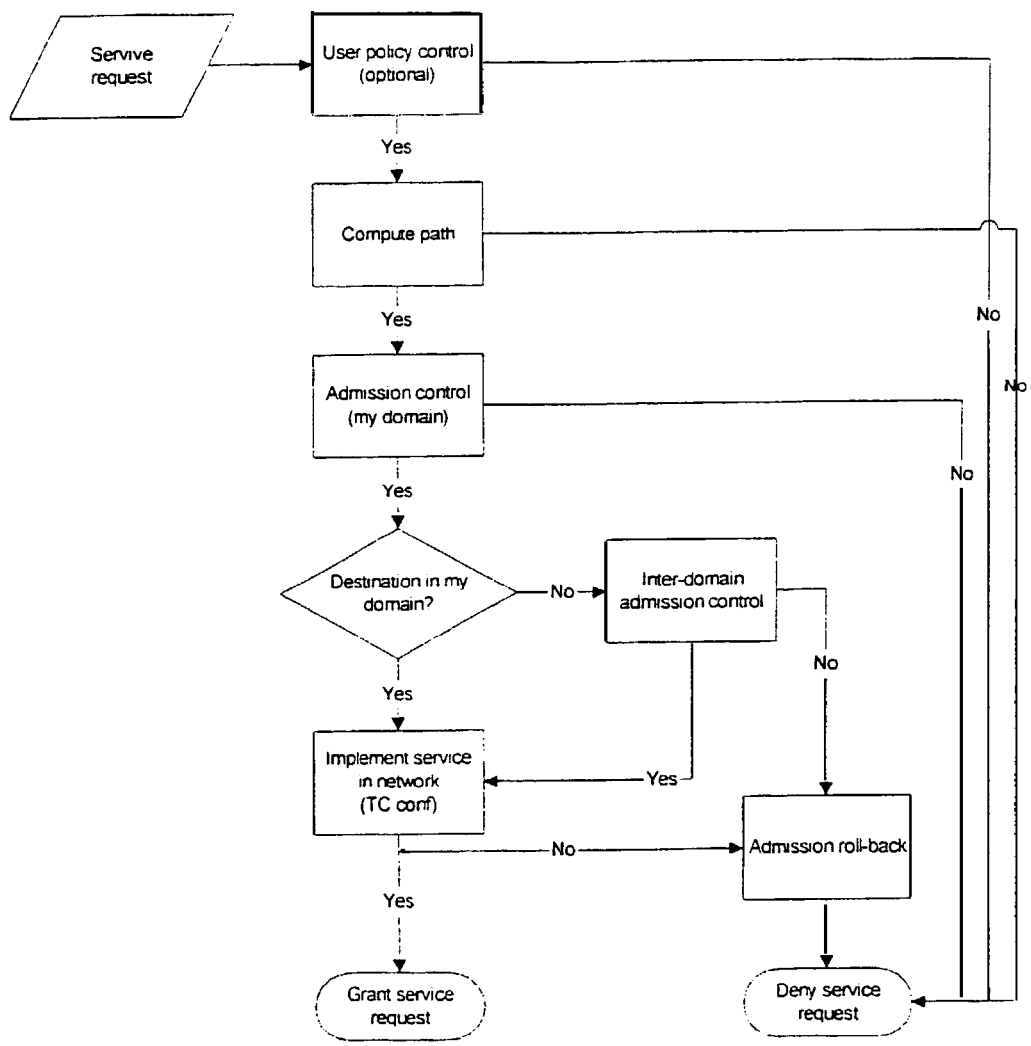

FIG. 5 shows a flowchart describing how a bandwidth broker according to the present invention handles requests.

Figure 6:
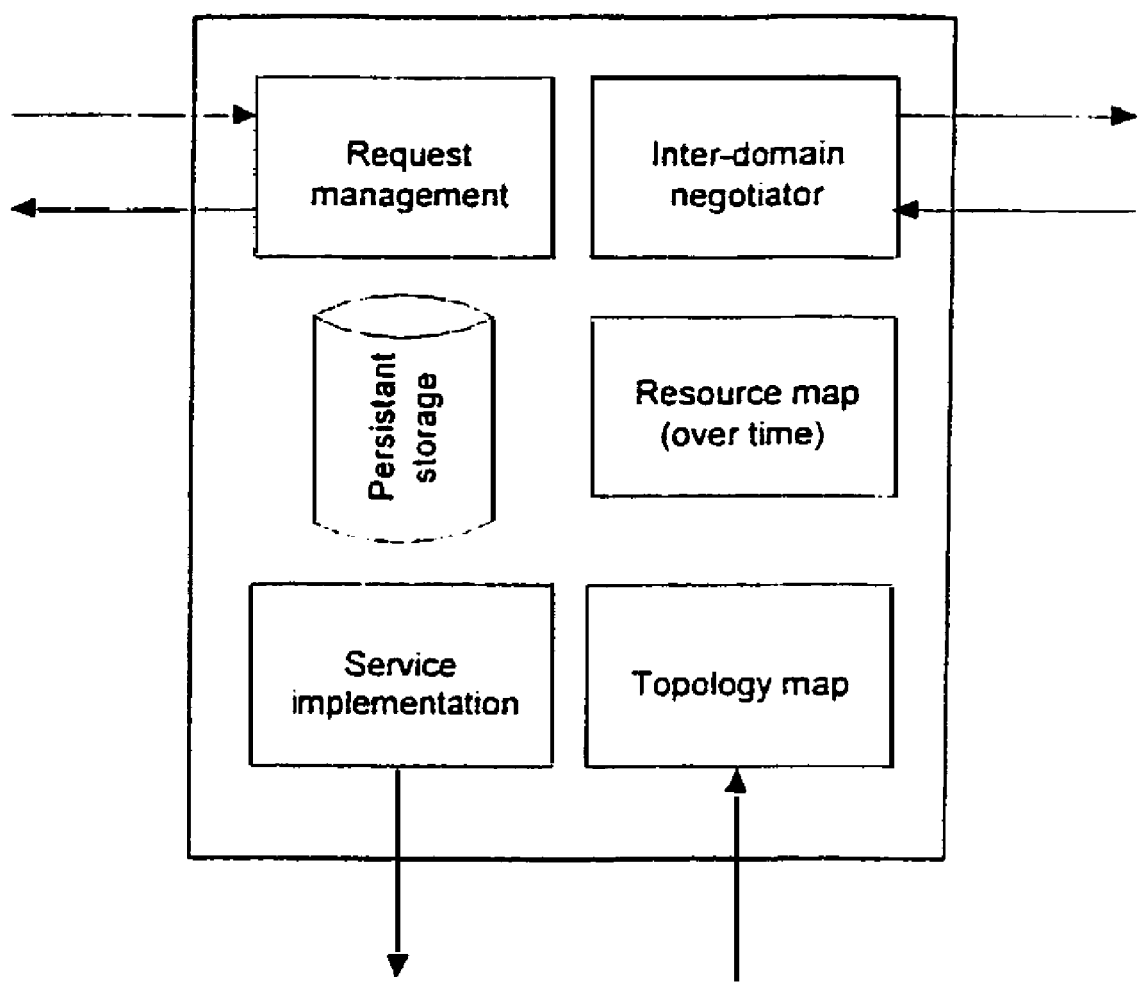

FIG. 6 shows functional blocks of a bandwidth broker according to the present invention.

DETAILED DESCRIPTION OF PREFERRED EMBODIMENTS OF THE INVENTION

Figure 1:
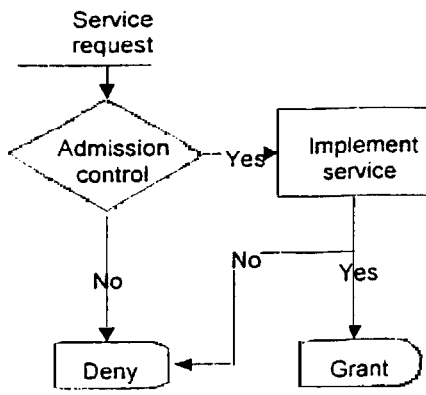
FIG. 1 is schematic illustration of a service model in DiffServ or MPLS.
Figure 2:
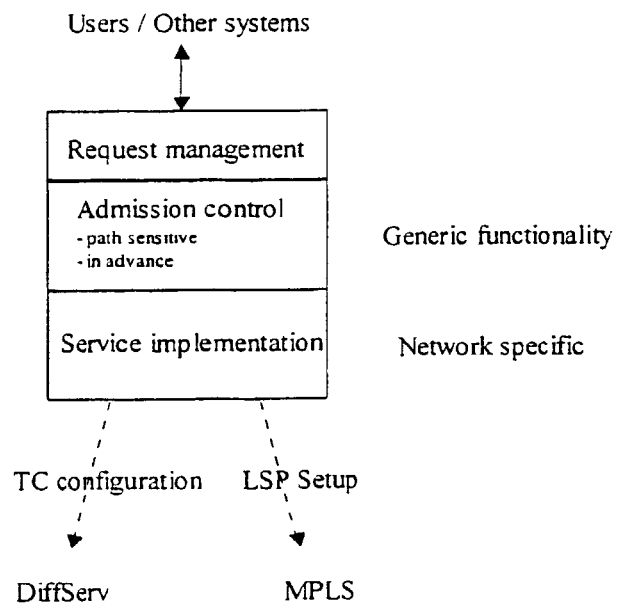
FIG. 2 shows functional blocks that schematically illustrate the present invention.

FIG. 2 shows functional blocks that schematically illustrate the present invention.

Note that the routing part of [RATES] is excluded and that the method according to the present invention relies entirely on existing routing and does not itself actively compute routes.

By referring to FIG. 2 the functionality of the present invention is schematically described below:

Request management. This interface handles all incoming requests. Requests are made either by clients to the system (within the system's domain) or peering systems in other domains. This functionality of this interface can be either that of [RATES] or [OLOV] or both.

Admission control. This block is implemented e.g. as described in [OLOV] to achieve path sensitivity and the ability to plan ahead of time. The same functionality is used for MPLS and DiffServ. The key components of this block are:

Topology information, which is used to compute paths for the requests (path sensitivity).

A data-structure which keeps resource usage information over time for each link in the topology (ability to plan ahead of time).

Service implementation. This is where functionality is mixed from [RATES] and [OLOV] to achieve services across heterogeneous domains. For MPLS networks the LSP set-up mechanism used in [RATES] is used. This includes setting up FEC-associations in MPLS edge-devices and to distribute labels for LSP-set-up in the MPLS core-devices. For DiffServ networks all that is required is configuration of so-called Traffic Conditioners (TC) that are arranged in the routers. Traffic conditioning may involve any of the functions classifying, metering, marking, shaping and dropping packets. Diff-Serv edge devices typically perform traffic conditioning to associate the correct PHB with traffic streams (classifying and marking) and make sure that the stream complies with its traffic profile (metering, shaping and dropping). It should be noted that there are many logical similarities between how the edge-devices in the MPLS and the TCs in the DiffServ handle the service implementation.

Figure 3:
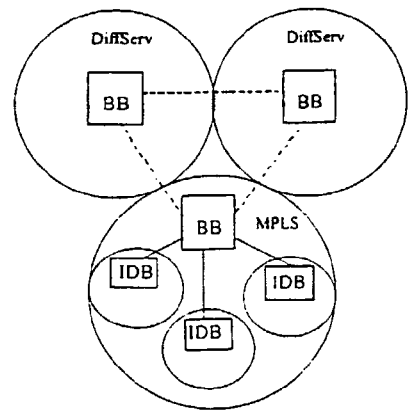
FIG. 3 shows the overall architecture according to the present invention.

The overall architecture according to the present invention is shown in FIG. 3. Note in particular that the BB in the MPLS domain is responsible for inter-domain signaling and how it controls a set of Intra-Domain Brokers (IDBs) within its own domain. Within the MPLS domain the central BB is responsible for passing resource requests to the intra-domain brokers. Each intra-domain broker is responsible for admission control and LSP setup in an OSPF area (or other equivalent flat link state-domains).

FIG. 4 provides an example scenario where a VLL spanning two domains, A and B, is setup. Domain A comprises an ingress router 2 and an egress router 4. The egress router 4 of domain A is connected to, or is equivalent to an ingress router 6 of domain B. Domain B also comprises an egress router 8. This example shows how the end-to-end problem is solved. Step by step, the following happens:

1. A request for a VLL of rate R from network SRC to network DST is passed to the BB of domain A and may be done in numerous ways. Some examples are human interaction with a request system, function invocation across a service request API from a management system, and application signaling and COPS/RSVP proxy in the ingress router. Generation of a request for a Virtual Leased Line (VLL) of rate (or bandwidth) R from a source network (SRC) to a destination network (DST) and then apply the request to a Bandwidth Broker of domain A ($BB_A$).
2. $BB_A$ passes a request to a Bandwidth Broker in domain B ($BB_A$) regarding a VLL of rate R from the domain ingress in B to DST, provided that $BB_A$ is aware of that DST is reached via domain B. There are numerous possible ways to treat this type of inter-domain request. For sake of this example, we say that the request passed to the BB in domain B is for a VLL of rate R, from the domain ingress in B to DST.
3. Simultaneously $BB_A$ performs path sensitive admission control according to layer 3 routing from the SRC ingress router to the domain B egress router. This is achieved by looking up the path through domain A and evaluating the resource availability on each link in the path.
4. Upon receiving the request from domain A, the BB in domain B does the following:
   a. Given the ingress from domain A and the destination DST, the BB finds out that-the first hop area for the request is area 1 and passes a request to that intra-domain broker, which performs admission control (and possibly LSP setup) for its area.
   b. Passing a request to one or many involved intra-domain brokers (IDB) in domain B, wherein each intra-domain broker performs admission control (and possibly LSP setup) in its area.
   c. Given the answers from both the involved intra-domain brokers, a response is passed back to the BB in domain B.
5. The BB in domain A receives the response from domain B and passes it back to the requesting party. If the request was admitted along all pieces of the path, the BB engages in Traffic Conditioners (TC) configuration in the ingress router for SRC.
6. Given that all steps were successful, there is now a VLL of rate R from SRC to DST, which is:
   Policed at the ingress for SRC,
   routed normally through domain A,
   policed again at the ingress for domain A into domain B,
   Classified as a FEC at the ingress in domain B
   Label switched through domain B until it reaches the destination DST.

The second object of the present invention, related to the resource planning over time, is achieved by a second preferred embodiment of the invention. According to this embodiment the same steps as above are performed with the difference that no configuration action is taken until the start time for the request (the configuration in step 5 is performed at the start time for the request). Admission control for the request is made at the time of the request, and if the request is granted configuration of traffic conditioners and LSP set up are scheduled to take place at the start time of the request.

In the example illustrated with references to FIG. 4 only two BB were involved. In a more generalised implementation a much higher number is involved. As indicated above a BB is arranged to communicate with BBs in neighbouring domains, allowing QoS spanning several domains. Generally a BB communicates with BBs one domain hop away only (i.e. with neighbours). This is related to the way inter-domain routing is done in the Internet. For each destination outside a BBs own domain, it knows the next domain hop on the path just as border routers know the next domain hop for each destination. Addressing information for neighbouring BBs is obtained either by configuration or some auto-discovery mechanism.

A bandwidth broker BB that performs path-sensitive admission control handles requests as described in the flowchart in FIG. 5. The steps in case of success are described below:

Optionally make sure that the request is within the user policy (note that a user may be anything from a human to a neighbouring BB). This may fail if, for example, the request is for a rate that is higher than allowed by the user policy.

Compute the path for the request. This may fail if the request contains source or destination addresses that lie outside the BBs range of known addresses.

Admission control for all links in the path that belong to this BBs domain. This is done with respect taken to the time parameters, if any, specified in the service request. This step may fail due to lack of resources along any of the links in the path.

If this request involves other domains, do inter-domain admission control. There are a number of options for this step:

If aggregation is used, neighbouring BBs may reserve trunks between their domains and allow reservations within those trunks, which means there will be no per-request inter-domain interaction. In such a case, if the current trunk is large enough to fit the current request, it can be granted immediately. If not, on the other hand, the request may be queued awaiting resources in the trunk or may even be denied, both of which events can serve as input to the process of re-evaluating the inter-domain trunk.

If no aggregation is used, an inter-domain request will be passed to the neighbouring BB.

When the admission control step(s) have been taken it is time to implement the service. This step may, for example, fail due to temporary problems in networking equipment Respond to the requesting party that the request was granted or denied.

If one of the first three steps fails, the request will be denied immediately. If service implementation or inter-domain admission control fails, the admission roll-back step must be taken to free resources in the BBs own domain.

FIG. 6 shows functional blocks of a bandwidth broker according to the present invention. In short the blocks are described as follows:

Request management. A BB handles requests originating from a variety of sources ranging from humans to neighbouring BBs.

Persistent storage. A BB with the ability to do admission control over time must have persistent storage, where it stores records of all its granted requests and also user-related data such as policies or accounting information.

Topology map. A BB that performs path sensitive admission control must have correct topology and routing information to be able to lookup the paths of incoming requests. Peering as a link-state router primarily retrieves this information. It may also be retrieved via configuration or some other mechanism.

Resource map. To be able to do admission control for the VLL service, resource information must be coupled to the topology into a resource map. This information may be collected automatically by probing the network or it may be statically configured.

Service implementation. A BB must be able to implement granted services. According to the present invention, this is done either by configuring traffic conditioners in edge-devices in DiffServ domains or by LSP-setup in MPLS domains.

Inter-domain negotiator. Whenever a service spans more than one domain, a BB must be able to contact the BB in the neighbouring domain. This function may be implemented with or without request aggregation.

In general Bandwidth Brokers may deal with two different kinds of policies. The most basic type of policy, which all BBs manage, is what is often called QoS policy. This kind of policy is within this application referred to as a service. The policy to transport certain data with a certain QoS is in fact a service. The other kind of policy that a BB optionally manages is user policies. This type of policy controls what services users are allowed to use, and possibly how much and at what times etc.

According to a preferred embodiment of the invention the QoS parameter is the rate R. Naturally, a person skilled in the art is aware of numerous alternative QoS parameters.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. Method in a packet based communication network including network domains, wherein at least one domain is a Multiprotocol Label Switching MPLS domain, to establish a virtual leased line, VLL, between a source (SRC) and a destination (DST) in different domains in order to achieve packet transfer between the source (SRC) and the destination (DST), wherein the bandwidth broker (BB) is associated to each network domain and the bandwidth broker (BB) is configured to control a hierarchical routing domain, the method comprises the following steps:

i) generate a request from en equity for a Virtual Leased Line, VLL, having a predefined Quality of Service, QoS, from a source network (SRC) to a destination network (DST) and apply the request to a Bandwidth Broker (BB) of a domain A, $BB_A$, associated to the source network;

ii) $BB_A$ establishes the different domains involved to reach the destination network (DST);

iii) $BB_A$ directly or indirectly passes requests to all Bandwidth Brokers (BB) of the involved domains regarding a VLL of the predefined QoS from ingress to egress of each domain;

iv) each involved bandwidth broker (BB) performs admission control in its domain; v) each involved bandwidth broker (BB) returns a result of the admission control to $BB_A$ that passes it back to the requesting entity and if the request was admitted along all domains between the source (SRC) and the destination (DST) a VLL of the predefined QoS is granted, characterized in that step iv) comprises the following step: performing [LSP] Label Switched Path, LSP. setup and passing resource requests from the Bandwidth Broker (BB) to at least one intra-domain (1DB), wherein each intra-domain broker (1DB) is responsible for admission control and the Label Switched Path, LSP, setup.

2. Method according to claim 1, characterized in that if said domains comprise at least one Differentiated Services, DiffServ, domain, the method comprises the following step to be performed after step v): vi) $BB_A$ engages in Traffic Conditioners configuration in the ingress router for SRC in order to establish a VLL of the predefined QoS.

3. Method according to claim 1, characterized in that said domains comprise at least one Differentiated Services, DiffServ, domain and one Multiprotocol Label Switching, MPLS, domain.

4. Method according to claim 1, characterized in that said predefined QoS is a rate, R.

5. Method according to claim 1, characterized in that the bandwidth broker (BB) comprises a topology map and routing information to be able to perform path sensitive admission control of incoming requests, wherein the information is retrieved by peering as a link-state router.

6. Method according to claim 4, characterized in that the bandwidth broker (BB) comprises a data structure which keeps resource usage information over time for each link in the topology which enables ability to plan ahead of time.

7. Method according to claim 1, characterized in that a bandwidth broker (BB) in a specific domain performs admission control for all links in the path that belong to that domain.

8. Method according to claim 1, characterized in that a bandwidth broker (BB) comprises a storage, where it stores records of all its granted requests and also user-related data such as policies or accounting information.

* * * * *